United States Patent [19]

Blackmon et al.

[11] Patent Number: 4,963,025

[45] Date of Patent: Oct. 16, 1990

[54] APPARATUS AND METHOD FOR CALCULATION OF SHAPE FACTOR

[75] Inventors: James B. Blackmon; Don Edwards, both of Irvine, Calif.

[73] Assignee: McDonnell Douglas Corporation, Long Beach, Calif.

[21] Appl. No.: 193,044

[22] Filed: May 12, 1988

[51] Int. Cl.$^5$ ............................................. G01B 11/00
[52] U.S. Cl. ..................................... 356/376; 358/107
[58] Field of Search ........................ 356/376; 350/314; 358/93, 107

[56] References Cited

U.S. PATENT DOCUMENTS 3,205,767  9/1965  Weber et al. ......................... 350/314
4,564,275  1/1986  Stone ....................................... 353/3

OTHER PUBLICATIONS

"Central Receiver Solar Thermal Power System, Phase I, CDRL Item 2 Preliminary Design Report", Oct. 1977.

Primary Examiner—F. L. Evans
Attorney, Agent, or Firm—Curt L. Harrington; George W. Finch; John P. Scholl

[57] ABSTRACT

The apparatus and method herein provides for the calculation of shape factors and transfer factors of any object, particularly useful in radiative heat transfer analysis. The object sought to be characterized can be a model of full sized. A radiometer measures the light flux from various surfaces of an object, and a computer is used to assign each flux to a finitely preselected area. After all of the surfaces of the object have been measured and accounted for, the computer is than enabled to compute the shape factor of the object utilizing the relationships stated in the disclosure. Techniques of measurement include illumination/draping, electroluminescent panels, and projective illumination.

32 Claims, 4 Drawing Sheets

APPARATUS AND METHOD FOR CALCULATION OF SHAPE FACTOR

BACKGROUND OF THE INVENTION

The present invention relates to a device and method utilizable to calculate the transfer factor and ultimately the geometric shape factor of an object. The geometric shape factor, sometimes called view factor, is an important parameter used in radiative heat transfer analysis. The transfer factor is representative of the radiant energy from a surface i which reaches a surface j, both directly and by reflection from other surfaces. The reflections can be multiple; that is, energy emanating from surface i can reflect off of several surfaces before reaching surface j. The shape factor, or view factor, is the fraction of energy emitted by a surface i which is intercepted directly by surface j. The shape factor is highly dependent on the relative distance separating surfaces i and j and their angular orientation with respect to each other.

The calculation of theoretical shape factors is an important step in the design process. Shape factors are necessary to the fundamental heat transfer equations which describe the radiative heat transfer characteristics of any system. It is economically necessary to know the radiative heat transfer characteristics during the design process, and before construction. In the event that a particular design offering other advantages would produce too severe a temperature profile, it can be altered to eliminate the harmful profile without the excessive costs of reconstruction. The geometry of an array of objects receiving radiation, reflecting radiation or emitting radiation, can cause high temperature gradients over small areas which may degrade its structural integrity. It is therefore necessary to ascertain the radiative heat into and out of relatively small areas of the structure. Procurement of the shape factors is an expensive and integral part of the radiative heat transfer analysis.

Calculating a shape factor for two surfaces of simple geometric shape is relatively easy since the known geometric characteristics of the surfaces and the known distances and orientations of the surfaces simplify the problem. The total radiative flux into or out of a surface is dependent upon radiation exposure, temperature, orientation and reflectivity of each surface. Radiative flux leaving surface i, in the presence of a surface j, equals its temperature to the fourth power times its emissivity and times the Stefan Boltzman constant, as well as that portion of the radiative flux received from surface j which is reflected from surface i. Radiative flux entering surface i equals that portion of the radiative flux received from surface j which is not reflected but absorbed.

The radiative flux received at surface i from surface j, and the radiative flux received at surface j from surface i is highly dependent upon the areas of the surfaces and their distance and geometric orientation. This complex geometric data is, for any two surfaces, reducible to a single ratio of the percent of radiative energy at one surface received at the other surface. This percent of radiative energy transfer is the geometric shape factor.

It is evident that adding additional surfaces increases both the number of surfaces for which emissive radiation calculations must be performed as well as increasing the reflectivity components for all surfaces, for each additional surface. Thus the flux to be calculated for each surface increases as $N + (N-1)N$ or $N^2$ for additional surfaces. For a complex object, it is desirable to "divide" the surface of an object into as many small surfaces or "nodes" as possible in order to get a more exact temperature profile. But when the number of nodes are increased, the calculational steps increase profusely. Another complication when many surfaces are involved is "shadowing," the blockage of the view of surface j from surface i by a surface k.

A good example of a case wherein the calculation of shape factor is critical is in the design of an orbiting space station. The extremes of heat and cold, as well as the need to expel generated energy, make heat transfer calculations and the shape factor calculations critical to the design process. The great expense involved in construction prohibits the construction of a full scale model for thermal testing. Even if such a model were constructed, the conditions to which the structure would be subjected in the space environment would be almost impossible to simulate on earth.

Conventional shape factor and thermal analysis calculation methods are relatively time consuming, especially if high accuracy is required. Computers programmed to characterize the thermal environments of a space structure using current methods would be expected to consume over 5,000 hours of computing time. Of this figure, about 4,000 hours would be needed to calculate the shape factors. At the present cost of computer time, such thermal characterization is estimated to exceed five million dollars.

It is well known in the aerospace industry that numerous designs necessary to a single project will require numerous design modifications throughout the design phase of the project. The prohibitive cost of calculating even a single set of shape factors for a single design becomes even more acutely cost Prohibitive when recalculation necessitated by design modification is required. With existing methods, a change in the configuration of the object requires a complete recalculation of the shape factors. At the current high cost of calculation, design modifications would be extremely costly.

Given the extensive computer time required for analysis, interactive computer design is also extremely costly, if not impossible, using current design methods. A design modification intended to remedy a problem in one part of the system could produce a deleterious effect elsewhere which would be discoverable only by a complete analysis of the shape factors.

Another problem encountered involves the nonidealities of the surface being measured. The ideal surface is one which emits and reflects radiation away from the surface with an intensity directed in all directions equally. A surface possessing this characteristic is termed a Lambertian surface. A non-ideal surface has a tendency to forward scatter and backscatter radiation to a greater extent than a Lambertian surface.

In a conventional system of calculation, the nonideality of a surface is not able to be taken to account in the calculations without further coding for more complex calculations. Such calculations would require a table of bidirectional reflectivity factors for each type of surface material used and use of the Monte Carlo computational algorithm which is known to be extremely costly.

SUMMARY OF THE INVENTION

The present invention provides for a calculation of transfer factors and shape factors using a video camera, monitor and digitizer to measure and assign a numerical value to the intensity of light emanating from the pre-specified surfaces, or nodes on an object being tested under illumination from a source of light. The video camera, modified to operate as a radiometer, (e.g., by removal of all automatic gain control circuitry) is fitted with filters (e.g., neutral density filters) which are insensitive to the wavelength of light filtered to enable use over a wide dynamic range of light intensities. When so modified and used with the present invention, the video camera becomes a digital image radiometer.

The present invention can be used with several types of light sources. Another alternative is to use an ordinary light source situated at appropriate angles relative to the object whose transfer factors and shape factors are being calculated. A narrow focused beam light can be sequentially projected onto each node on the object. Alternately, a Lambertian light source, such as an electroluminescent surface, can be placed directly on a particular node and activated. As a particular node is made luminous, other nodes in sight of the luminous node will receive varying amounts of light, depending on their distance and relative angular orientation with respect to the luminous node.

The light emanating from the luminous node is recorded, along with the light from each other node which is passively luminous with light emanating from the luminous node. An operator causes the logical identification of each node by selecting and identifying its location. The referencing of the identification of the node to the radiative intensity emanating from that node can be performed manually or automatically. For example, identification of the nodes could be accomplished by the use of edge detection algorithms performed automatically by computer. If remotely illuminated, the angle of the light source with respect to the object can be taken into account if needed. The angular location of the television camera with respect to the object is also recorded.

The present invention also provides for a computer to store and calculate appropriate values for use in calculating transfer factors and shape factors. After identification of the location of each node, a digital representation of the analog intensity of light emanating from the node is produced by an analog to digital converter. This process of digitization results in digital representations for the location, area, and intensity of each node. After the digitization of the nodes, the digital data are stored in computer memory awaiting later retrieval for further computation. After all data points are gathered, and once the computer has the reflectivity data characteristic of the surfaces, the computer then computes the relative intensities and the transfer factor for each node pair. The computer also uses experimental data to compute the self reflectivities of each node to compute the self transfer factors for each node. Lastly, by means of a straight forward matrix calculation method, the computer calculates the shape factors for each node pair.

The present invention also takes account of non-ideal surfaces. Since the object is physically illuminated, the effect of the non idealities of each surface are automatically taken into account. Also, gathering data using different camera angles, different light source angles, and different filters and averaging the data obtained using each different configuration will mitigate the effect of errors which would otherwise occur due to the effect of uneven illumination on the non-ideal surfaces.

The system of the present invention can handle many more nodes than current techniques will allow. Each camera "picture" can be used to produce as many nodes as desired. Since the present invention can produce a transfer factor pair with a multiplication and a division operation, all the transfer factors can be calculated in seconds. The computer can then calculate the shape factors for the system. The computational time is greater than that required for transfer factor calculations, but far less than the 4,000 hours required using conventional methods.

The present invention also has the added advantage that it can be used with a scale model to give the same results obtainable with a full sized model. The use of a scale model will permit incorporation of structural changes at a slight cost. The surfaces of the model can be the same types of surfaces which will be incorporated into the full scale production of the object for which the shape factors are sought, or a standard near-Lambertian surface can be used to represent any other such surface.

In addition, the present invention can be used with the illumination of the model taking place within a room having translucent, externally illuminated panels. These panels should be as nearly Lambertian as possible. This technique eliminates the need to reposition a single beam light source in order to produce averageable data to make up for the non-idealities of the surfaces, but introduces the need to sequentially drape a black cover over various Portions of the model.

The configuration using the room having the illuminated panels is also utilizable to take to account the effect of light having a specific mixture of frequencies. The frequency mix of light used for illumination affects the amount of reflectivity of a given surface due to the frequency sensitivities of the surface material. One frequency of light may result in a set of transfer factors different than those resulting from another frequency of light. The same is true for the mixture of light frequencies.

A significant factor for satellites in orbit above the earth is the radiant energy reflected from the earth's surface. This light, known as the earth's albedo, can be simulated by projecting a photographic slide of the earth from a perspective, identical to that which would be experienced during orbit, upon the wall of the room containing the model. The model is then illuminated by light reflected from the projection. The intensity can then be adjusted to exactly match the albedo experienced for a given orbital altitude. The cost estimated in using the present invention to generate a complete transfer factor, shape factor and thermal configuration for a space station is estimated to be less than 1/100 of the cost using conventional methods.

DETAILED DESCRIPTION OF THE PREFERRED EMBODIMENT

Figure 1:
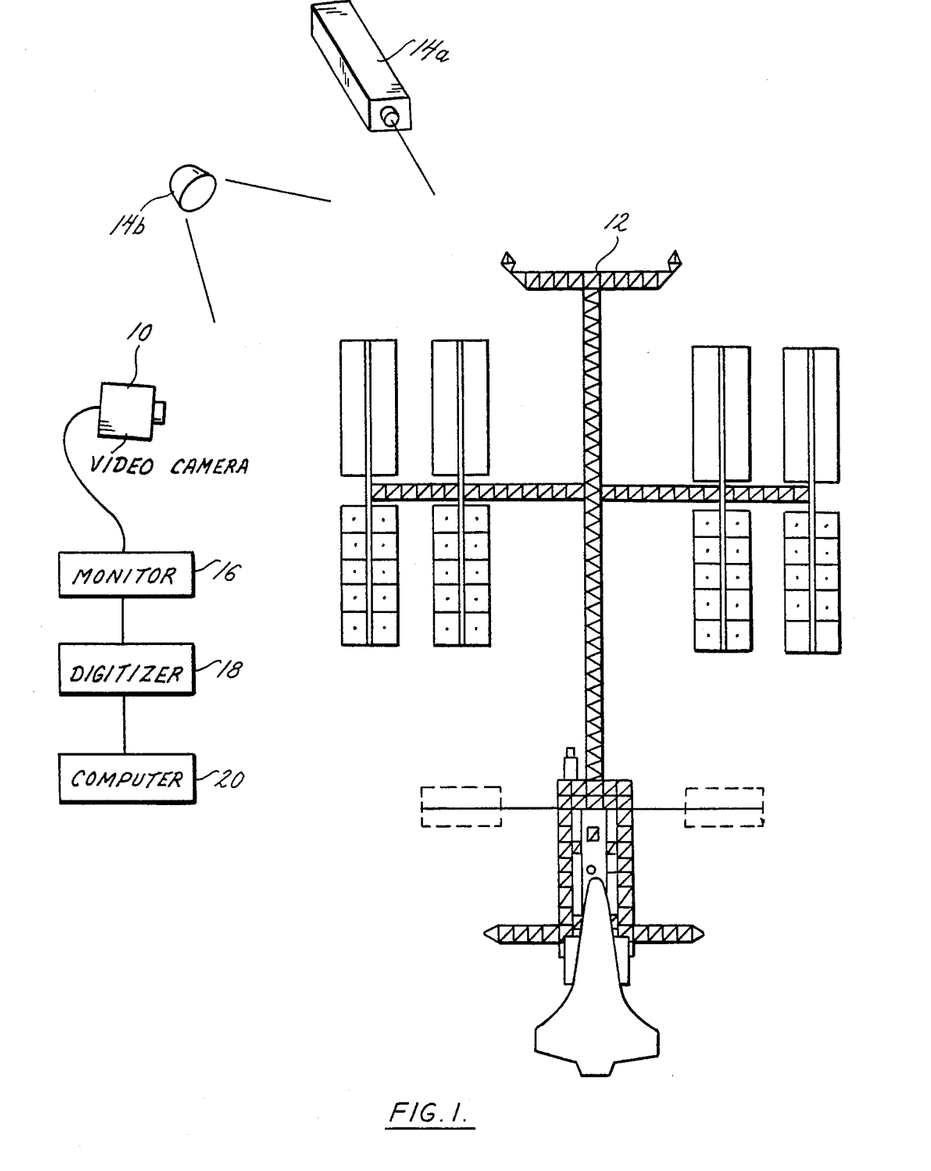
FIG. 1 is a simplified diagram of the system of the present invention set to measure the shape factors of a model of a space station.

Referring to FIG. 1, a simplified diagram of the system of the present invention is illustrated. A video camera 10 is shown focused upon a scale model 12 illuminated by a remote source denoted generally as 14. Light source 14a is a laser or other collimated light source. Light source 14b represents a conventional light source. Video camera 10 is electrically connected to a monitor 16. Monitor 16, which displays the image of scale model 12 as seen by video camera 16, is connected to digitizer 18. Digitizer 18 is connected to computer 20.

Camera 10 receives light from model 12 and produces a signal whose intensity is proportional to the intensity of the light reflected from the model due to single and multiple reflections from remote light source 14. Remote light source 14 may be either a conventional light source or a laser light source. A collimated or laser light source 14 is especially advantageous when model 12 is small. Light source 14 may be moved with respect to model 12 by a track system (not shown) or other suitable means.

Video camera 10 has been modified to act as a digital image radiometer. These modifications include the removal of all automatic gain circuitry, as well as any other circuitry which would limit a linear response to radiative light intensity. The video camera 10 output should be free from the effects of temperature, either by means of independent cooling or the addition of temperature compensation circuitry. Remote light source 14 and camera 10 can be moved around scale model 12 in order to gauge the relative illumination of all nodes on scale model 12. Monitor 16 aids in visual selection, identification and demarcation of areas of scale model 12 into nodes.

Digitizer 18 acts as an analog to digital converter to convert the analog intensity of light received from scale model 12 into a digital representation. Digitizer 18 also acts to convert the relative spacial orientation of a node selected on monitor 16 into a digital format. The digital intensity, location and identity of each node is associated together as a data point. These data are transmitted to the computer 20. Computer 20 stores the data in its memory to begin the calculations once the taking of all selected data points is completed.

Figure 2:
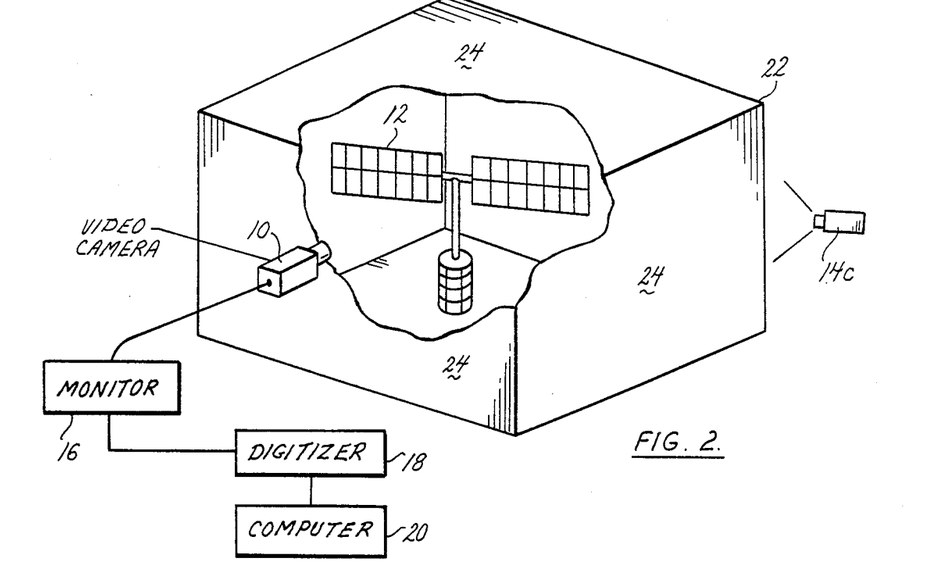
FIG. 2 is a simplified diagram of an alternate method of using the system of the present invention shown in FIG. 1.

Referring to FIG. 2, an alternative arrangement utilizing the present invention is shown. Scale model 12 is located within an enclosure 22 having walls 24. The walls 24 are made of any Lambertian type material having a constant brightness. Also shown are camera 10, monitor 16, digitizer 18 and computer 20 which are the same as in FIG. 1.

Walls 24 can be illuminated by shining light thereon from inside enclosure 22 or, if translucent, illuminated external of enclosure 22. The light shined thereon could be from a laser, as was shown in 14a of FIG. 1, or any of a class of incandescent sources as was shown in 14b of FIG. 1, which could be an ordinary light bulb, a slide projector 14c shown in FIG. 2, or any other heat driven light source. The earth's albedo can be simulated by projecting a photographic slide of the earth from a prospective similar to that which would appear during an orbit upon the wall 24 of the room 22 containing the model 12. The arrangement of FIG. 2 eliminates the need to move a light source 14, shown in FIG. 1, to different angles to insure that a mean value is calculated for the nodes, but incurs the penalty of having to drape and redrape the model many times.

Figure 3:
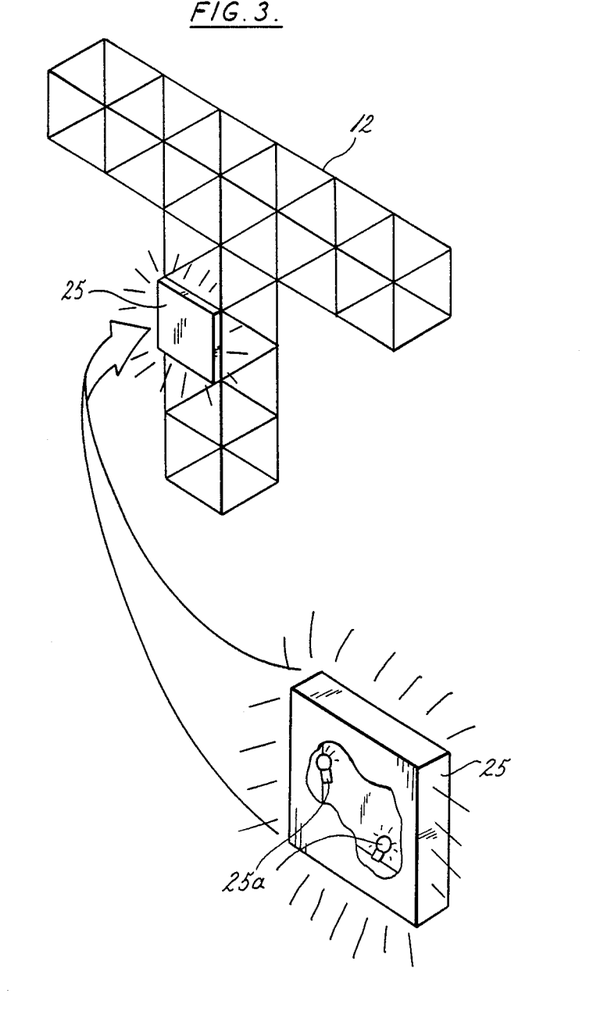
FIG. 3 illustrates an alternate illumination method utilizable in the system of the present invention.

FIG. 3 shows another alternative method for producing the illumination to be scanned by video camera 10. Luminescent panels 25 are fixably attached to as great an area of model 12 as is desired to form a node. Panel 25 is then made luminous, and its luminosity is recorded along with the reflected luminosity of each of the other nodes. Self illumination is the radiation emitted from a first surface which reflects off of other surfaces and returns to the first surface which is then reflected from the first surface.

To eliminate self illumination so that the intrinsic luminosity of a source can be determined, the luminescent panel 25 is placed in a black enclosure, thereby prohibiting self illumination, and the luminous intensity is measured. After the intensity of the panel is measured in the presence of reflective surfaces, the difference in intensity yields the amount of self illumination present. The black room illumination given off by panel 25 in a black enclosure need only be obtained once and would remain the same for sufficiently long periods as to minimize the amount of re-calibration. This quantity would be repeatedly used in the calculations.

At the bottom of FIG. 3 is illustrated a cut away section of luminescent panel 25 illustrating the presence of a pair of light bulbs 25a. Light bulbs 25a can be powered by battery or a remote power source. As illustrated in FIG. 3, light from light bulbs 25a passes through the transluscent surfaces of luminescent panel 25.

Figure 4:
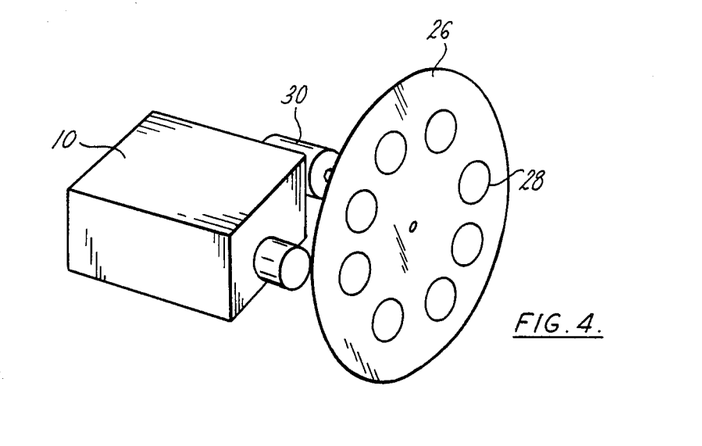
FIG. 4 is a simplified drawing of the camera used in the system of FIG. 1 illustrating the use of a series of neutral density filters.

Referring to FIG. 4, video camera 10 is fitted with a filter wheel 26 supporting a series of filters 28. Filter wheel 26 is shown attached to a motor 30 attached to video camera 10. Filters 28 should ideally attenuate all wavelengths of light evenly. Such a filter is termed a neutral density filter. Neutral density filter 28 may be made from exposed photographic plate. The filters 28 should be arranged in order of ascending or descending darkness about the peripheral of filter wheel 26. Filter wheel 26 may be automatically controlled by motor 30. Motor 30 may be automatically controlled by computer 20 of FIG. 2 or by analog circuitry (not shown) which would select the filter which limits the radiative light entering video camera 10 to an intensity within the dynamic range of video camera 10. Alternatively, motor 30 may be made to respond to rotation upon command of an operator.

Filter wheel 26 is included to extend the dynamic range of camera 10. If the brightness being measured saturates the camera's ability to discern the actual value of its brightness, an appropriate filter 28 is placed in front of camera 10 to reduce its sensitivity. The factor by which the sensitivity is reduced is made known to computer 10 either by operator entry or any of a number of well-known position sensors (not shown) which can be attached to filter wheel 26 or motor 30 of FIG. 4. Selfdetermination of the sensitivity factor can also be accomplished by measuring the relative intensity of a given illuminated surface before and after the filters 28 are changed if the values measured are within the dynamic range of camera 10. Self-determination of the sensitivity factor can also be accomplished by measuring the relative intensity of a given illuminated surface before and after the filters 28 are changed, if the values so measured are both within the dynamic range of the camera.

The operation of the system of the present invention beyond the physical manipulation scale model 12, camera 10, monitor 16 and digitizer 18 is computer based and software driven. Referring to FIG. 1, an operator causes camera 10 to be aimed at the scale model 12 which is illuminated by a light source 14. The distance from camera 10 to scale model 12 may need to be known, since intensity is a function of distance. Angular placement of camera 10 and light source 14 with respect to the scale model 12 are known.

Figure 5:
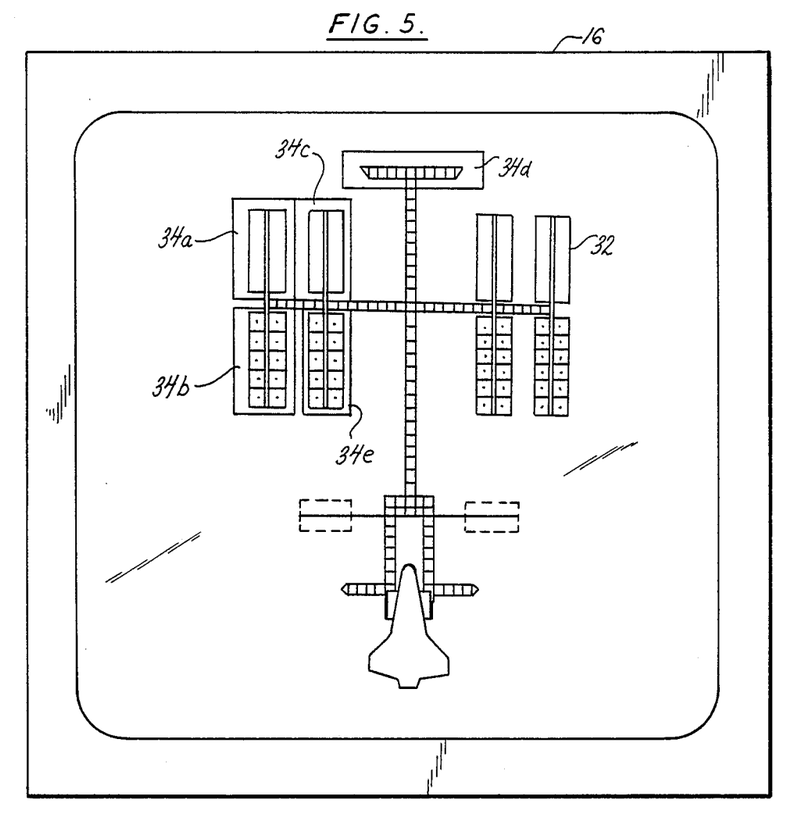
FIG. 5 is an illustration of the monitor of FIGS. 1 and 2 illustrating the identification of nodes.

Referring to FIG. 5, an image 32 of scale model 12 appears on the monitor 16. The number and size of areas of light measurement or nodes are specified according to the degree of accuracy required or are selected at the time of viewing of image 32 by an operator. Areas of the monitor which illustrate areas of the scale model 12 to be designated as nodes are boxed off and identified as nodes. The image 32 is boxed off into nodes by the operator using any of a number of well known interactive computer tools such as a mouse or pad (not shown).

In FIG. 5, there are five example nodes 34 shown. Labelled 34a, 34b, 34c, 34d, and 34e, the relative areas enclosed by the nodes 34 are recognized and measured. The computer may use the same screen coordinates used by the computer to identify the distances between points on monitor 16. Using the aforementioned distance and angular orientation data and the screen coordinates, the distances between the nodes can be computed if desired. The computer also computes the brightness of each of the nodes and some form of node identification so that it can be accessed by the computer as an identifiable data set. The computer may also compute the areas of the nodes. However, as discussed below, only the relative intensity of the areas observed and the reflectivity are needed to determine the transfer factors between nodes. Areas and distances are not required to determine the transfer factor values. However, only the relative intensity of the areas observed is needed to determine the transfer factors between nodes. Areas and distances are not needed to determine these factors.

As previously stated, radiative heat transfer is mainly concerned with "transfer factors and shape factors". For the present discussion, the transfer factor T is defined as the average intensity of light observed over a first surface j divided by the product of the average intensity of light emitted from a second surface i and the reflectivity of the first surface j. The relationship is:

$$T_{j-i} = \frac{I_j}{r_j I_i}.$$

The transfer factor includes all light reaching surface j from surface i regardless of path. The transfer factor takes to account the area, angle and distance from the model 12. This includes radiative light emanating from surface i which may reflect off of several other surfaces before reaching surface j. Since the transfer factor is a simple ratio light source leaving surface i to the light observed leaving surface j, the transfer factor is easily calculated by the experimental measurement of intensity.

The reflectivity $r_j$ is an experimentally ascertained factor for the surface characteristics of surface j. All surfaces on scale model 12 are normally of the same type or covered with the same material and will therefore have the same reflectivity r. It is understood that there are several methods available to generate the raw intensity data for the various nodes. The direct illumination method of FIG. 1 can be used. Alternately, scale model 12 could be placed within enclosure 22 of FIG. 2 and illuminated by reflection off of or translucent projection through walls 24. A luminous Lambertian light source could be placed at a node, illuminated, and the intensity of the Lambertian light source and the other nodes measured. It has been discovered that all of these methods will yield an accurate result. Finally, in many instances, the transfer factor and shape factor are essentially identical, except for concave types of surfaces or irregular configurations. This is hereinafter described, and a method for determining shape factor from measured transfer factors is described.

The one additional data point which must be gathered for each node in order to enable computation of the shape factors is the self transfer factor. The self transfer factor for a node is defined as the ratio of radiative energy reflectively emanating from a node solely due to light received which was reflected from other objects, divided by the product of its surface reflectivity and total average radiative energy emitted in the absence of reflection from other objects.

As previously stated, the problem is simplified when using a luminescent panel 25, as in FIG. 3, because the characteristics of the panel's illumination need only be measured once. Also, when using a collimated light source to illuminate a Particular node, the source strength, which is a product of light intensity, area and solid angle, is constant and its strength need be measured only once. So, for a particular configuration shown in FIG. 1, this data can be gained by measuring the intensity of a particular node when illuminated with all other nodes exposed, as before, and then measuring the intensity o the subject node with the other nodes covered by a black cloth or other drape. Subtracting the intensities will readily yield the additional reflective light emanating from the node supplied by reflection from the other nodes back onto the node being measured.

When more even lighting is used, as in FIG. 2, the self reflectivity can be calculated merely by knowing the radiative intensity under even multidirectional lighting within enclosure 22, for one small sample of surface material, measured in the absence of other reflecting bodies. The self transfer factor for any of the above methods is then $$T_{kk} = \frac{I_{mk} - I_c}{r_k I_c}.$$

Here $I_{mk}$ is the intensity measured by the camera 10 on node k, $I_c$ is the characteristic intensity which the surface of model 12 would exhibit in the absence of other reflecting surfaces, and $r_k$ is the reflectivity of surface k, an experimentally acquired value characteristic of the surface k.

Because a node has a finite area, the intensity of light recorded for a node is actually the average intensity over the surface of the node. A node having uneven illumination would effectively have its intensity "averaged" over the surface of the node. When beam illumination is used, readings are averaged as the beam is stepped across a node. Thus, nodal intensity is an average intensity. Once each node is identified and its intensity measured and recorded, it is a simple matter, once the intensities for all nodes have been recorded, to divide the average intensity of each node by the average intensity of each other node, using the appropriate reflectivities, r, to generate a series of node-to-node transfer factors. The generated node-to-node transfer factors and self transfer factors are stored in the computer 20 memory.

Generally in radiative heat transfer calculations, the shape factors are first calculated based upon a theoretical treatment of an object's shape using simplifying assumptions. The various Pathways for light to travel from the source to a surface both directly and via reflected pathways are summed.

The result of these discounting factors is the shape factor, F, which is a measure of the amount of radiative energy leaving one surface that travels in a direct path and arrives at a second surface. The shape factor automatically takes account of the relative distance and orientation of the surfaces. However, since the shape factor is defined as the fraction of the total radiative energy leaving one surface which is intercepted directly by another surface, the shape factors do not take account of the effects of third surface reflection.

Since light from a node of an illuminated object automatically contains the effects of light reflected from other surfaces, the simpler shape factors are not Physically observable. If it is assumed that the reflections from other bodies are negligible, significant error will be injected into the result.

The advantage of the straightforward nature of the thermal transmission equations which use the geometric shape factors is readily apparent. With surface i being one surface and j being another surface, such that the surfaces irradiate each other, the basic heat transfer equation is given by:

$$Qij = Fij \, (\sigma T_i^4 - T_j^4).$$

This states that net radiative energy Qr leaving surface i and flowing to surface j is equal to the shape factor between surface i and surface j, times the difference in their temperatures to the fourth power times the Stefan Boltzman constant.

Discovering the shape factors from the transfer functions involves a solution derived from a method of theoretical elimination of surfaces is known as "blackening". Blackening is as a process in which each surface in a system of surfaces whose reflectivity is $r_k$ is sequentially and theoretically changed to a black surface having $r_k = 0$. The derivations are omitted, but the resulting equations are set forth. Assume a model having a number of nodes or surfaces whose radiation intensities have been measured, and whose node to node and self transfer factors have been calculated in accordance with the above disclosure.

The self-shape factor is given by:

$$F_{k-k} = \frac{T_{kk}}{e_k^2 + (r_k \, T_{kk})}.$$

Here $F_{k-k}$ is the self-shape factor between any surface and itself; $e_k$ is the emissivity of a surface k, determined experimentally; and $r_k$ is the reflectivity of surface k. $T_{kk}$ is the transfer factor between surface k and itself. This equation allows calculation of all self-shape factors.

Next a pair of intermediate shape factors are calculated in the next two equations which are useful only in the final equation. The intermediate shape factors result as each surface is theoretically sequentially blackened. The intermediate shape factors have an asterisk (*) to show that their quantities and meaning are intermediate and useful only in the final equation.

$$F^*_{k-j} = (1 - r_k F_{k-k})) \, T_{k-j}$$

$F^*_{k-j}$ is the intermediate shape factor for any surface k and all other surfaces j (none of the surfaces j the same as surface k). For a system of N nodes, this equation is repeated (N−1) times to generate a series of N−1 intermediate shape factors whose subscript begins with the node number k.

Again, $F_{k-k}$ is the shaPe factor between surface k and itself, $e_k$ is the emissivity of surface k and $r_k$ is the reflectivity of surface k. $T_{k-j}$ is the transfer factor between surface k and each other j surface (none of the surfaces j the same as surface k).

$$F^*_{i-k} = (1/e_k) \, (1 - (r_k F_{k-k})) \, T_{i-k}$$

Where $F^*_{i-k}$ is an intermediate shape factor between surface i (none of the surfaces i the same as surface k) and surface k. Again, $e_k$ is the emissivity of surface k and $r_k$ is the reflectivity of surface k.

Again, $F_{k-k}$ is the shape factor between surface k and itself while $T_{i-k}$ is the transfer factor between surface k and each other i surface (none of the surfaces i the same as surface k). Finally the usable shape factor is given by $$F_{i-j} = T_{i-j} - \frac{r_k}{1 - (r_k F^*_{k-k})} F^*_{i-k} F^*_{k-j}.$$

Here $F_{i-j}$ is the shape factor between surface i and surface j, $T_{i-j}$ is the transfer factor between surfaces i and j, $r_k$ is the reflectivity of surface k, and $F_{k-k}$ is the self shape factor of surface k. $F^*_{i-k}$ and $F_{k-j}$ are intermediate shape factors calculated above.

Figure 6:
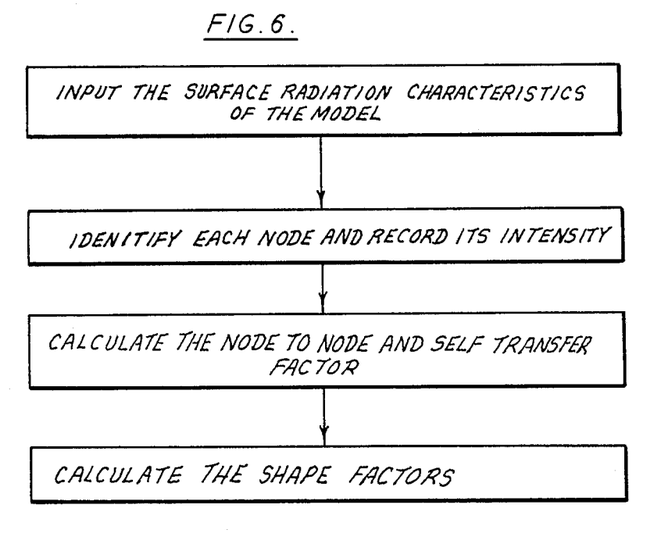
FIG. 6 is a block diagram illustrating the steps necessary in the system of the present invention.

The above calculations require matrix generation and sequential do-loop solution. The flow chart beneficial in illustrating the logical process of the present invention is shown in FIG. 6. A computer program, written in the basic language, useful in practicing the present invention is set forth below.

```
10 REM BLACKEN
20 REM GENERATES SIMULATED DATA
30 REM AND APPLIES BLACKENING
40 REM ALGORITHM TO REDUCE THEM
70 DIM F(30,30),S(30,30),T(30,30)
80 DIM B(30),ES(30),QM(30),QP(30),RS(30)
100 REM SHAPE FACTORS INPUT
110 PRINT
120 PRINT "RETURN NUMBER OF SURFS"
130 INPUT N
140 PRINT "RETURN FIJ'S ROW BY ROW"
200 FOR I=1 TO N
210 PRINT "ROW I=";I
220 FOR J=1 TO N
230 PRINT " COLUMN J=";J
240 INPUT F(I,J)
250 NEXT J
260 NEXT I
```

```
300 REM REFLECTIVITIES INPUT
310 PRINT
320 PRINT "RETURN OPTION"
330 PRINT "OP=1 ALL THE SAME"
340 PRINT "OP=2 DIFFERENT R'S"
350 INPUT OP
360 IF OP=2 THEN GOTO 500
370 PRINT "RETURN REFLECTIVITY"
380 INPUT RA
400 REM UNIFORM REFLECTIVITY
410 FOR I=1 TO N
420 RS(I)=RA
430 ES(I)=1-RA
440 NEXT I
450 GOTO 570
500 REM CUSTOM REFLECTIVITIES
510 PRINT " RETURN REFLECTIVITIES"
520 FOR I=1 TO N
530 PRINT " SURFACE I=";I
540 INPUT RS(I)
550 ES(I)=1-RS(I)
560 NEXT
570 PRINT
580 PRINT "SIMULATED RADIOSITY DATA"
600 REM SOURCE LOOP
610 FOR K=1 TO N
620 IF RS(K)=0 THEN GOTO 900
630 FOR I=1 TO N
640 B(I)=0
650 QP(I)=0
660 NEXT I
670 QO=1200 * RS(K)
680 B(K)=QO / ES(K)
700 REM ITERATION LOOP
710 FOR L=1 TO 10
720 FOR I=1 TO N
730 SUM=0
740 FOR J=1 TO N
750 QP(J)=ES(J) * B(J)+RS(J) * QM(J)
760 SUM=SUM+F(I, J) * QP(J)
770 NEXT J
780 QM(I)=SUM
790 QP(I)=ES(I) * B(I)+RS(I) * SUM
800 NEXT I
810 NEXT L
820 PRINT
830 PRINT "RADIOSITIES FOR K=";K
840 PRINT
850 FOR I=1 TO N
860 IF I=K GOTO 890
870 T(I,K)=QP(I) / (RS(I) * QP(K))
880 GOTO 900
890 T(K, K)=(QP(K)-QO) / (RS(K) * QO)
900 PRINT "QP(";I;")="; INT (100 * QP(I)+(.5) / 100; TAB (18); "T(";I;",";K;")="; INT (10000 * T(I,K)+(.5) / 10000
910 NEXT I
920 NEXT K
960 PRINT : PRINT : PRINT : PRINT : PRINT : PRINT : PRINT : PRINT
970 PRINT : PRINT : PRINT : PRINT : PRINT : PRINT : PRINT : PRINT
980 PRINT "DIR DATA REDUCTION"
990 PRINT
1000 REM DIRF DATA REDUCTION
1010 FOR J=1 TO N
1020 FOR I=1 TO N
1030 IF I=J THEN GOTO 1100
1040 S(I,J)=ES(I) * ES(J) * T(I,J) * (1+RS(J) * T(J,J))
1050 PRINT " S(";I;",";J;")=";S(I,J)
1090 GOTO 1200
1100 S(J,J)=ES(J) * ES(J) * T(J,J)
1150 GOTO 1050
1200 NEXT I
1300 NEXT J
1310 PRINT
1320 PRINT "BLACKENING ALGORITHM"
1400 REM BLACKENING
1410 K=N+1
1420 FOR KK=1 TO N
1430 K=K-1
1440 DK=ES(K) * ES(K)+RS(K) * S(K,K)
1450 FK=S(K,K) / DK
1460 D=1-RS(K) * FK
1470 PRINT
1480 PRINT "BLACKENING SURFACE ";K
1490 PRINT
1500 FOR J=1 TO N
1510 IF J=K THEN GOTO 1600
1520 F(K,J)=S (K,J) * D / ES(K)
1530 F(J,K)=S (J,K) * D / ES(K)
1540 GOTO 1700
1600 F(K,K)=FK
1700 NEXT J
1710 IF K > 1 THEN GOTO 1800
1720 PRINT "REDUCED DATA FOR"
1730 PRINT " SHAPE FACTORS"
1740 PRINT
1800 FOR I=1 TO N
1810 IF I=K THEN GOTO 2000
1820 FOR J=1 TO N
1830 IF J=K THEN GOTO 1900
1840 F (I,J)=S(I,J)-RS(K) * F(I,K) * F(K,J) / D
1900 NEXT J
2000 NEXT I
2010 FOR I=1 TO N
2020 FOR J=1 TO N
2040 S(I,J)=F(I,J)
2050 PRINT " F(";I;",";J;")="; INT (10000 * S(I,J)+(.5) / 10000
2060 NEXT J
2070 NEXT I
2100 NEXT KK
```

While the invention has been described in conjunction with specific embodiments it is evident that many alternatives, modifications and variations will be apparent to those skilled in the art in light of the foregoing description. Accordingly, it is intended to embrace all such alternatives, modifications, and variations as fall within the spirit and scope of the appended claims.

What is claimed is:

1. A device for measuring the relative amounts of light leaving the surfaces of an object and computing the shape factors between the surfaces of said object, comprising:

light sensing means for receiving light from said object and measuring its intensity;

identification means, connected to said light sensing means, for referring the intensity of light received from a surface, to the surface from which the light emanated;

means for digitizing, connected to said identification means, to produce a digital representation of the intensity of light emanating from its referred surface;

means for computing, connected to said means for digitizing, for accepting said digitized intensities, said identities of said surfaces, and computing the shape factors associated with each surface from which light was received.

2. The device for measuring the shape factors of the surfaces of an object, as recited in claim 1, and further comprising:

primary light source means for providing a source of light to said surfaces which will reflectively emanate from said surfaces.

3. The device for measuring the shape factors of the surfaces of an object, as recited in claim 2, and wherein said primary light source means further comprises a point source of optical light located remotely with respect to and directed toward said surfaces of said object.

4. The device for measuring the shape factors of the surfaces of an object, as recited in claim 2, and wherein said primary light source means further comprises a collimated light beam source of optical light located remotely with respect to and directed toward said surfaces of said object.

5. The device for measuring the shape factors of the surfaces of an object, as recited in claim 1, and further comprising:

primary light source means, located on said surfaces of said object for providing a source of light emanating from said surfaces.

6. The device for measuring the shape factors of the surfaces of an object, as recited in claim 5, and wherein said primary light source means further comprises an electroluminescent panel.

7. The device for measuring the shape factors of the surfaces of an object, as recited in claim 6, and wherein said electroluminescent panel has translucent surfaces, and essentially covers a prespecified surface of said object.

8. The device of claim 7 wherein the external surfaces of said luminescent panel are essentially Lambertian.

9. The device for measuring the shape factors of the surfaces of an object, as recited in claim 2, and wherein said primary light source means further comprises:

a projection wall; and,
a slide projector directed at said projection wall and illuminating said projection wall, the light reaching said surfaces of said object from said projection wall.

10. The device of claim 9 further comprising a photographic slide having a preselected mixture of frequencies of light transmission to enable calculation of shape factors specific to a particular light frequency mixture 11. The device for measuring the shape factors of the surfaces of an object, as recited in claim 1, wherein said light sensing means further comprises a specially modified video camera, operating as a radiometer, receiving light from said surfaces.

12. The device for measuring the shape factors of the surfaces of an object, as recited in claim 1, wherein said identification means further comprises:

a video monitor illustrating said surfaces; and,
means for visually demarking and digitally characterizing the boundary of each said surface of said object illustrated on said monitor.

13. The device for measuring the shape factors of the surfaces of an object, as recited in claim 12, wherein said means for digitizing further comprises:

an analog to digital converter capable of producing a digital representation of the relative intensity of light emanating from the demarked boundary of each said surface of said object illustrated on said monitor.

14. A device for measuring the relative amounts of light leaving the surfaces of an object and computing the shape factors of the surfaces of an object, comprising:

a source of light illuminating said surfaces of said object;
a video camera receiving light from said surfaces;
a video monitor illustrating said surfaces;
means for demarking and digitally characterizing the boundary of each said surface of said object illustrated on said monitor and for computing said shape factors of said surfaces of said object; and,
an analog to digital converter capable of producing a digital representation of the relative intensity of light emanating from the demarked boundary of each said surface of said object.

15. The device for measuring the relative amounts of light leaving the surfaces of an object and computing the shape factors of the surfaces of said object, as recited in claim 14 and further comprising:

at least one filter, having known light attenuation characteristics, located between said video camera and said surfaces of said object.

16. The method of measuring the relative amounts of light leaving the surfaces of an object and computing the transfer factors of the surfaces of said object comprising the steps of:

inputting the radiation characteristics of said surfaces of said object;
illuminating said object with light;
sensing the relative amounts of light reflected from each of said surfaces of said object; and,
computing the transfer factors for each said surface.

17. The method of claim 16 further including the step of computing the shape factors between the surfaces.

18. The method as in claim 16 in which said computing the transfer factors step is performed according to the following equations:

$$T_{j-i} = \frac{I_j}{r_j I_i} \qquad 1.$$

$$T_{kk} = \frac{I_{mk} - I_c}{r_k I_c} \qquad 2.$$

wherein $I_{mk}$ is the intensity measured; $I_c$ is the characteristic intensity of a surface in the absence of other reflecting surfaces; and $r_k$ is the reflectivity of surface k.

19. The method of claim 18 further including the step of computing the shape factors between the surfaces.

20. The method as in claim 19 in which said computing the shape factors step is performed according to the following equations:

$$F_{k-k} = \frac{T_{kk}}{e_k^2 + (r_k T_{kk})} \qquad 1.$$

where $F_{k-k}$ is the self-shape factor between any surface and itself; $e_k$ is the emissivity of a surface k; and $r_k$ is the reflectivity of surface k; and, $T_{kk}$ is the transfer factor between surface k and itself;

$$F^*_{k-j} = (1/e_k)(1-(r_k F_{k-k}))T_{k-j} \qquad 2.$$

where $F^*_{k-j}$ is the intermediate shape factor for any surface k and all other surfaces; and $T_{k-j}$ is the transfer factor between surface and each other j surface;

$$F^*_{i-k} = (1/e_k)(1-(r_k F_{k-k}))T_{i-k} \qquad 3.$$

where $F^*_{i-k}$ is an intermediate shape factor between surface i and surface k; and, $T_{i-k}$ is the transfer factor between surface k and each other i surface;

$$F_{i-j} = T_{i-j} - \frac{r_k}{1-(r_k F^*_{k-k})} F^*_{i-k} F^*_{k-j} \qquad 4.$$

where $F_{i-j}$ is the shape factor between surface i and surface j; $T_{i-j}$ is the transfer factor between surfaces i and j; $r_k$ is the reflectivity of surface k; $F_{k-k}$ is the self shape factor of surface k; and, $F^*_{i-k}$ and $F^*_{k-j}$ are intermediate shape factors shown above.

21. The method of claim 17 wherein the inputting the radiation characteristics of said surfaces step further comprises the steps of:
inputting the characteristic intensity of the surfaces of said object;
inputting the reflectivity of the surfaces of said object; and,
inputting the emissivity of the surfaces of said object.

22. The method of claim 21 wherein the inputting the characteristic intensity of the surfaces of said object further comprises the steps of:
covering all surfaces of said object except one with a light absorptive material;
illuminating the one non-covered surface with a source of light; and,
measuring the intensity of light emanating from said non-covered surface to obtain the characteristic intensity of said non-covered surface;
repeating said covering, illuminating and measuring steps above to obtain the characteristic intensity of all of said surfaces of said object.

23. The method of claim 21 wherein the computing the shape factors between the surfaces step further comprises the steps of:
computing the self transfer factors for each said surface;
computing a series of transfer factors for each surface, each said transfer factor representative of the light reaching each surface from each other surface;
computing the self shape factors for each said surface;
computing a pair of intermediate shape factors for each said surface; and,
computing the shape factors between each pair of said surfaces from said intermediate shape factors.

24. The method of claim 21 wherein the computing the shape factors between the surfaces step further comprises the steps of:
dividing the difference between the intensity of light emanating from and the characteristic intensity of a surface, k, by the product of the characteristic intensity of the surface and the reflectivity of the surface, k, to compute the self transfer factors for each said surface k;
dividing the self transfer factor of surface k by the sum of the emissivity of surface k, to the power of 2, and the product of the reflectivity of surface k times the self transfer factor of surface k, to compute the self shape factors for each said surface k;
dividing the intensity of light emanating from surface k by the product of the intensity of light emanating from each other surface j and the reflectivity of surface k to compute a series of transfer factors between surface k and each other surface j;
dividing the product of the transfer factor between surface k and each other surface j, $T_{k-j}$, and unity minus the product of the reflectivity of surface k and the self shape factor for surface k by the emissivity of surface k to compute a first set of intermediate shape factors between each said surface k and each other surface j;
dividing the product of the self transfer factor of surface k and unity minus the product of the reflectivity of surface k and the self shape factor for surface k, by the emissivity of surface k to compute a second set of intermediate shape factors between each said surface k and each other surface i; and,
subtracting from the transfer factor between any surfaces i and j (i=j) the quantity the quotient of the product of said first set of intermediate shape factors, said second set of intermediate shape factors, and the reflectivity of surface k divided by the quantity of unity minus the product of the reflectivity of surface k and the self shape factor for surface k, to compute the shape factors between each surface and the other surfaces.

25. The method of claim 24 wherein all computing steps are performed by a digital computer.

26. A digital image radiometer system for measuring the radiative characteristics of an object and calculating the shape factors of the designated surfaces of said object, comprising:
a video camera for receiving and sensing the intensity of light emanating from at least one said surface of said object;
a video monitor connected to said video camera for identifying the radiative light received with the surface it emanated from;
a digitizer connected to said video monitor to receive a signal indicative of the intensity of radiative light emanating from a designated surface, and produce a digital representation of that intensity;
a digital computer, connected to said digitizer, for accepting said digital representations of the intensities of said designated surfaces, accepting said identities of said designated surfaces associated with said digital representations of said intensities, and computing the shape factors between said surfaces.

27. The digital image radiometer system, as recited in claim 26, and further comprising:

illumination means for illuminating said surfaces of said object.

28. The digital image radiometer system, as recited in claim 26, and further comprising:
   a projection wall;
   a slide projector directed at said projection wall and illuminating said projection wall, the light reaching said surfaces of said object from said projection wall.

29. The digital image radiometer system, as recited in claim 26, and further comprising:
   a multiplicity of luminescent panels, having Lambertian translucent surfaces, and located upon said designated surfaces of said object, and, essentially covering said surfaces.

30. The digital image radiometer system, as recited in claim 26, and further comprising:
   a multiPlicity of luminescent panels, having Lambertian electroluminescent surfaces, and located upon said designated surfaces of said object, and, essentially covering said surfaces.

31. The digital image radiometer system, as recited in claim 26, and wherein said video camera has no automatic gain control circuitry, and whose signal output at a pixel is directly proportional to the incident light level at that pixel.

32. A digital image radiometer system for measuring the radiative characteristics of an object and calculating the shape factors of the designated surfaces of said object, comprising:
   a radiometer for receiving and sensing the intensity of light emanating from said surfaces of said object, said radiometer having no automatic gain control circuitrY, and having a linear response signal output directly proportional to the intensity of radiative light received;
   a video monitor connected to said radiometer to enable designation of said surface areas of said object, and to allow identification of the intensity of radiative light received with the designated surface it emanated from;
   an analog to digital converter connected to said radiometer to receive a signal indicative of the intensity of radiative light emanating from a designated surface, and produce a digital representation of that intensity; and,
   a digital computer, connected to said analog to digital converter, for accepting said identities of said designated surfaces, accepting said digital representations of the intensities of light associated with said designated surfaces, and computing the shape factors between said surfaces.

* * * * *